(12) United States Patent
Choi

(10) Patent No.: US 11,645,199 B2
(45) Date of Patent: May 9, 2023

(54) STORAGE DEVICE AND GARBAGE COLLECTION METHOD THEREOF

(71) Applicant: SAMSUNG ELECTRONICS CO., LTD., Suwon-si (KR)

(72) Inventor: In-Hwan Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/903,519

(22) Filed: Jun. 17, 2020

(65) Prior Publication Data

US 2020/0320001 A1 Oct. 8, 2020

Related U.S. Application Data

(62) Division of application No. 15/194,689, filed on Jun. 28, 2016, now Pat. No. 10,719,438.

(30) Foreign Application Priority Data

Jun. 30, 2015 (KR) .................. 10-2015-0092950

(51) Int. Cl.
*G06F 3/00* (2006.01)
*G06F 12/02* (2006.01)
*G06F 3/06* (2006.01)

(52) U.S. Cl.
CPC .......... *G06F 12/0253* (2013.01); *G06F 3/061* (2013.01); *G06F 3/064* (2013.01); *G06F 3/0608* (2013.01); *G06F 3/0652* (2013.01); *G06F 3/0679* (2013.01); *G06F 12/0246* (2013.01); *G06F 2212/1024* (2013.01);

(Continued)

(58) Field of Classification Search
None
See application file for complete search history.

(56) References Cited

U.S. PATENT DOCUMENTS 6,434,575 B1 8/2002 Berry et al.
6,493,730 B1 12/2002 Lewis et al.
(Continued)

FOREIGN PATENT DOCUMENTS

JP 2013210919 A * 10/2013
KR 100789406 B1 12/2007
(Continued)

OTHER PUBLICATIONS

Korean Notice of Allowance dated Jan. 26, 2023, cited in corresponding Korean Patent Application.
(Continued)

*Primary Examiner* — Midys Rojas
(74) *Attorney, Agent, or Firm* — Volentine, Whitt & Francos, PLLC

(57) ABSTRACT

A memory controller is for controlling operations of a nonvolatile memory including a first memory block group for storing a first type of data and a second memory block group for storing a second type of data. The memory controller includes a garbage collection management unit configured to execute a garbage collection policy in which a first garbage collection criteria is applied to the first memory block group, and a second garbage collection criteria is applied to the second memory block group, where first garbage collection criteria is different than the second garbage collection criteria.

19 Claims, 17 Drawing Sheets

(52) U.S. Cl.
CPC ............... *G06F 2212/1044* (2013.01); *G06F 2212/2022* (2013.01); *G06F 2212/7205* (2013.01)

(56) References Cited

U.S. PATENT DOCUMENTS

| | | |
|---|---|---|
| 7,631,162 B2 | 12/2009 | Gorobets |
| 7,890,550 B2 | 2/2011 | Jung et al. |
| 2003/0093778 A1 | 5/2003 | Bak et al. |
| 2008/0162611 A1 | 7/2008 | Wolczko et al. |
| 2009/0259701 A1 | 10/2009 | Wideman et al. |
| 2012/0023144 A1 | 1/2012 | Rub |
| 2014/0006898 A1 | 1/2014 | Sharon et al. |
| 2014/0089569 A1 | 3/2014 | Pignatelli |
| 2015/0222705 A1* | 8/2015 | Stephens ............ G06F 3/067 709/214 |
| 2017/0083436 A1 | 3/2017 | Jung |
| 2017/0123700 A1 | 5/2017 | Sinha et al. |

FOREIGN PATENT DOCUMENTS

| | | |
|---|---|---|
| KR | 20100115057 A | 10/2010 |
| KR | 20100115090 A | 10/2010 |

OTHER PUBLICATIONS

Si-Woong Jang, "A wear-leveling improving method by periodic exchanging of cold block areas and hot block areas", Dongeui University, pp. 175-178.

Hyungho Gawk et al., "Partial Garbage Collection Technique for Improving Write Performance of Log-Structured File Systems", School of Information and Communication Engineering, Sungkyunkwan University, pp. 1439-1441.

* cited by examiner

STORAGE DEVICE AND GARBAGE COLLECTION METHOD THEREOF

CROSS-REFERENCE TO RELATED APPLICATIONS

This is a Divisional of U.S. application Ser. No. 15/194,689, filed Jun. 28, 2016, now U.S. Pat. No. 10,719,438 issued on Jul. 21, 2020, and a claim of priority under 35 U.S.C. § 119 is made to Korean Patent Application No. 10-2015-0092950 filed on Jun. 30, 2015, the disclosure of which is incorporated herein by reference in its entirety.

BACKGROUND

Embodiments of the inventive concepts described herein relate to data storage devices and to garbage collection techniques applied to data storage devices.

Garbage collection generally refers to the reclaiming of storage space occupied by objects, such as invalid data, that are no longer in use. For example, in the case of a flash memory device, when a program command calls for replacing a page of current data with new data, the flash memory device may store the new data in a page having an erased state, and invalidate the current data. In other words, in part due to its erase-before-write characteristics, the flash memory device does not overwrite the current data at its current page location, but merely invalidates the current data and stores the new data in another page. As the flash memory device continues to operate, invalid pages tend to accumulate in memory blocks that have not been recently erased. The accumulation of invalid pages generally reduces the amount of usable storage space in the flash memory device, and it can also slow down an operation of the flash memory device. Accordingly, so-called garbage collection operations may be performed on memory blocks containing significant numbers of invalid pages to reclaim some of the storage space. A garbage collection operation may include moving (copying) any remaining valid data from a target memory block to a different memory block and then erasing the target memory block. Garbage collection operations are typically performed automatically as part of memory management.

SUMMARY

In one aspect of the inventive concepts, a memory controller controls operations of a nonvolatile memory including a first memory block group for storing a first type of data and a second memory block group for storing a second type of data. The memory controller includes a garbage collection management unit configured to execute a garbage collection policy with respect to the first and second memory block groups, the garbage collection policy including selecting for garbage collection one of the first and second memory blocks having a higher garbage collection cost when the other of the first and second memory blocks contains valid data that can be erased without copying.

The memory controller may further include a host interface configured to interface with a host, a nonvolatile memory interface configured to interface with the nonvolatile memory, a processor, and a buffer memory. The processor may be configured to provide the nonvolatile memory with the first type of data via the nonvolatile memory interface for storage in the first memory block group, and to provide the nonvolatile memory with the second type of data via the nonvolatile memory interface for storage in the second memory block group.

The first type of data may include user data, and the second type of data may include metadata.

The garbage collection costs may correspond to an execution time of the garbage collection.

The garbage collection time may be based on a number of valid pages.

It may be determined that valid data of the second memory block can be erased without copying based on a data pattern of the valid data.

It may be determined that valid data of the second memory block can be erased without copying when the valid data is within a given address range.

It may be determined that valid data of the second memory block can be erased without copying when the valid data is journal data.

The nonvolatile memory interface may be configured to interface with a three-dimensional (3D) arrayed nonvolatile memory device.

In another aspect of the inventive concepts, a memory controller is for controlling operations of a nonvolatile memory including a first memory block group for storing a first type of data and a second memory block group for storing a second type of data. The memory controller a garbage collection management unit configured to execute a garbage collection policy in which a first garbage collection criteria is applied to the first memory block group, and a second garbage collection criteria is applied to the second memory block group, wherein first garbage collection criteria is different than the second garbage collection criteria.

The first garbage collection criteria may include comparing a garbage collection cost of the first memory block group with a first reference value, and the second garbage collection criteria includes comparing a garbage collection cost of the second memory block group with a second reference value which is different than the first reference value.

The first garbage collection criteria may include determining whether a garbage collection cost of the first memory block group is between a first reference value and a second reference value which is greater than the first reference value, and the second garbage collection criteria may include determining whether a garbage collection cost of the second memory block group greater than the second reference value.

The first type of data may be user data, and the second type of data may be metadata.

The second garbage collection criteria may include determining whether the metadata is within a predetermined address range.

The second garbage collection criteria may include determining whether the metadata has a predetermined pattern.

The second garbage collection criteria may include determining whether the metadata is journal data.

In yet another aspect of the inventive concepts, a memory controller includes a host interface configured to connect to a host, a nonvolatile memory interface configured to connect to a nonvolatile memory, and a garbage collection management module configured to execute a garbage collection policy with respect to first and second memory block groups of the nonvolatile memory. The garbage collection policy includes determining a garbage collection cost for each of the first and second memory block groups, determining whether valid data of the second memory block group can be erased without copying, executing garbage collection of the first memory block group when the garbage collection cost of the first memory block group is less than the garbage collection cost of the second memory block group, executing garbage collection of the first memory block group when the data of the second memory block can be erased without copying, and the garbage collection cost of the first memory block group is more than the garbage collection cost of the second memory block group, and executing garbage collection of the second memory block group when the data of the second memory can not be erased without copying, and the garbage collection cost of the first memory block group is more than the garbage collection cost of the second memory block group.

The first type of data may include user data, and the second type of data may include meta data.

The garbage collection costs may correspond to an execution time of the garbage collection.

The garbage collection time may be based on a number of valid pages.

It may be determined that valid data of the second memory block can be erased without copying based on a data pattern of the valid data.

It may be determined that valid data of the second memory block can be erased without copying when the valid data is within a given address range.

It may be determined that valid data of the second memory block can be erased without copying when the valid data is journal data.

The nonvolatile memory interface may be configured to interface with a three-dimensional (3D) arrayed nonvolatile memory device.

In still another aspect of the inventive concepts, a memory controller includes a processor and a garbage collection management unit. The processor is configured to control operations of a nonvolatile memory including a first memory block group for storing user data, a second memory block group for storing non journal metadata, and a third memory block group for storing journal data. The garbage collection management module is configured to execute a garbage collection policy with respect to the first, second and third memory block groups, the garbage collection policy including inhibiting garbage collection of the third memory block group.

The processor may be configured to store input data that is user data in the first memory block group, to store input data that is non journal metadata in the second memory block group, and to store journal data in the third memory block group.

The processor may be configured to determine whether the input data is non journal metadata or journal data based on an address range of the input data.

The processor may be configured to determine whether the input data is non journal metadata or journal data based on a data pattern of the input data.

In another aspect of the inventive concepts, a memory controller includes a processor and a garbage collection management unit. The processor is configured to control operations of a nonvolatile memory including a first memory block group for storing user data and a second memory block group for storing metadata. The garbage collection management module configured to execute a garbage collection policy with respect to the first and second memory block groups, the garbage collection policy including adaptively applying a stricter garbage collection criteria to a one of the first and second memory blocks having a smaller over provision area.

In still another aspect of the inventive concepts, a memory controller includes a processor and a garbage collection management unit. The processor is configured to control operations of a nonvolatile memory including a first memory block group for storing user data and a second memory block group for storing metadata. The garbage collection management unit configured to execute a garbage collection policy with respect to the first and second memory block groups, the garbage collection policy including suspending collection of the second memory block group when the metadata subject to garbage collection is journal data.

BRIEF DESCRIPTION OF THE FIGURES

The above and other aspects and features of the inventive concepts will become readily apparent from the detailed description that follows with reference to the accompanying figures, wherein like reference numerals refer to like elements throughout the various figures unless otherwise specified, and wherein.

DETAILED DESCRIPTION

Figure 1:
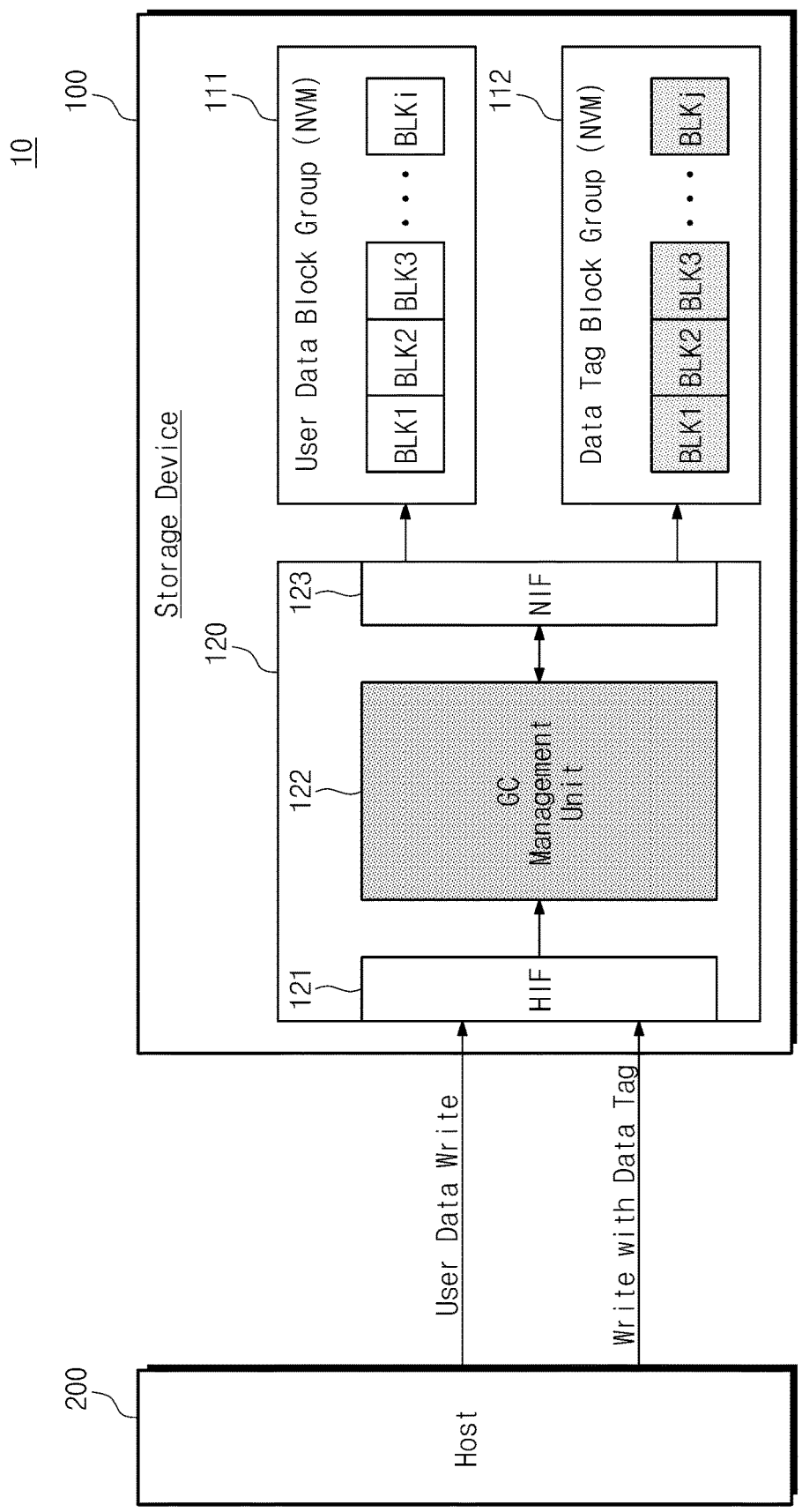
FIG. 1 is a block diagram schematically illustrating a computing system according to an exemplary embodiment of the inventive concepts.

Exemplary embodiments of the inventive concept will now describe the scope of the invention in detail and clearly to convey the scope of the invention to those skilled in the art.

Accordingly, while exemplary embodiments of the inventive concept are susceptible to various modifications and alternative forms, specific embodiments thereof are shown by way of example in the drawings and will herein be described in detail. It should be understood, however, that there is no intent to limit exemplary embodiments of the inventive concept to the particular forms disclosed, but conversely, exemplary embodiments of the inventive concept are to cover all modifications, equivalents, and alternatives falling within the spirit and scope of the invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As is traditional in the field of the inventive concepts, embodiments are described and illustrated in terms of functional blocks and units. These blocks and units are physically implemented by electronic circuits such as logic circuits, microprocessors, hard-wired circuits or the like, and may optionally be driven by firmware and/or software. Also, each functional block and unit of the embodiments may be physically separated into two or more interacting and discrete blocks or units without departing from the scope of the inventive concepts. Further, the functional blocks and units of the embodiments may be physically combined into more complex blocks or units without departing from the scope of the inventive concepts.

FIG. 1 is a block diagram schematically illustrating a computing system 10 according to an exemplary embodiment of the inventive concept. Referring to FIG. 1, the computing system 10 of the example of this embodiment includes a storage device 100 and a host 200.

In exemplary embodiments of the inventive concept, the computing system 10 may implemented as or in any of a variety of different electronics devices. Non-limiting examples include a computer, a portable computer, an ultramobile personal computer (UMPC), a workstation, a data server, a net-book, a personal data assistant (PDA), a web tablet, a wireless phone, a mobile phone, a smart phone, an e-book, a portable multimedia player (PMP), a digital camera, a digital audio recorder/player, a digital picture/video recorder/player, a portable game machine, a navigation system, a black box, a 3D television, a device capable of wirelessly transmitting and receiving information, an electronic component of a home network, an electronic component of a computer network, an electronic component of a telematics network, a radio-frequency identification (RFID) device, an electronic component of a computing system.

The host 200 controls memory operations of the storage device 100. The configuration of the host 200 is not limited in the inventive concepts, but generally the host 200 may, for example, include one or more processors, internal data memories, data interfaces, and so on. Examples of processors that may be included in the host 200 include a central processing unit (CPU), a graphic processing unit (GPU), and an application processor (AP).

The storage device 100 may be implemented as any of a variety of different memory platforms. Non-limiting examples include a solid state drive (SSD), an embedded multimedia card (eMMC), a memory card (e.g., a compact flash (CF), a secure digital (SD), a microSD, and a miniSD), a universal flash storage (UFS), and a universal serial bus (USB) memory.

Still referring to FIG. 1, the storage device 100, as it relates to the present embodiment, includes a first block group 111, a second block group 112 and a memory controller 120.

Each of the first block group 111 and the second block group 112 includes a plurality of memory blocks and may be contained in one or more nonvolatile memory (NVM) devices. For example, the first block group 111 may be included in one or more first nonvolatile memory devices, and the second block group 112 may be included in one or more second nonvolatile memory devices which are different than the one or more first nonvolatile memory devices. Alternatively, the first block group 111 and the second block group 112 may be contained in, or partially contained in, one or more of the same nonvolatile memory devices. Also, although two memory block groups 111 and 112 are shown in FIG. 1, it will be understood that the storage device 100 may include many more than two memory block groups.

The type of NVM technology is not limited according to the inventive concepts. Non-limiting examples of NVM devices that may be utilized in the embodiments herein include any one, or any combination of two or more, of NAND flash memory, vertical NAND flash memory (VNAND), NOR flash memory, resistive random access memory (RRAM), phase-change memory (PRAM), magnetoresistive random access memory (MRAM), ferroelectric random access memory (FRAM), and spin transfer torque random access memory (STT-RAM). Also, as will be described later, the NVM devices may be implemented with a three-dimensional (3D) memory cell array.

For purposes of description, the first block group 111 is designated as a user data block group in which user data is stored. In the example of this embodiment, the first block group 111 includes memory blocks BLK1 to BLKi (i being an integer of 2 or more).

Also for purposes of description, the second block group 112 is designated as a data tag block group in which metadata including a data tag is stored. In the example of this embodiment, the second block group 112 includes memory blocks BLK1 to BLKj (j being an integer of 2 or more).

The terms "user data" and "metadata" are used herein in manner consistent with the understanding of those in the art. Generally, "user data" is data containing content that may be controlled or manipulated by a user, such as word processing contents, image contents, spreadsheet contents, video contents, and so on. In contrast, "metadata" is generally characterized as data that is descriptive of user data or other data. A few examples of metadata include file size, file type, date created, dates modified, author, and so on. Also, according to the present embodiment, the aforementioned data tag (which may be identified as having a particular pattern) is used as a marker or flag to signify that the data is metadata as opposed to user data. For this reason, the second data block group 112 storing metadata is referred to herein a data tag group. However, the inventive concepts are not limited to distinguishing metadata in this manner (i.e., by data tags).

Still referring to FIG. 1, each of the memory blocks BLK1 to BLKi may include a plurality of pages, and each of the memory blocks BLK1 to BLKj may include a plurality of pages. Each page may include a plurality of memory cells, each of which stores at least one bit. For example, a page may include memory cells connected a same word line within a memory block. Further, in the case where each memory cell stores more than one bit (i.e., multi-level cell (MLC) memory cells), a physical page may be constituted by the memory cells connected to a same word line, and logical pages may be constituted by respective bits of the memory cells connected to a same word line.

Figure 13:
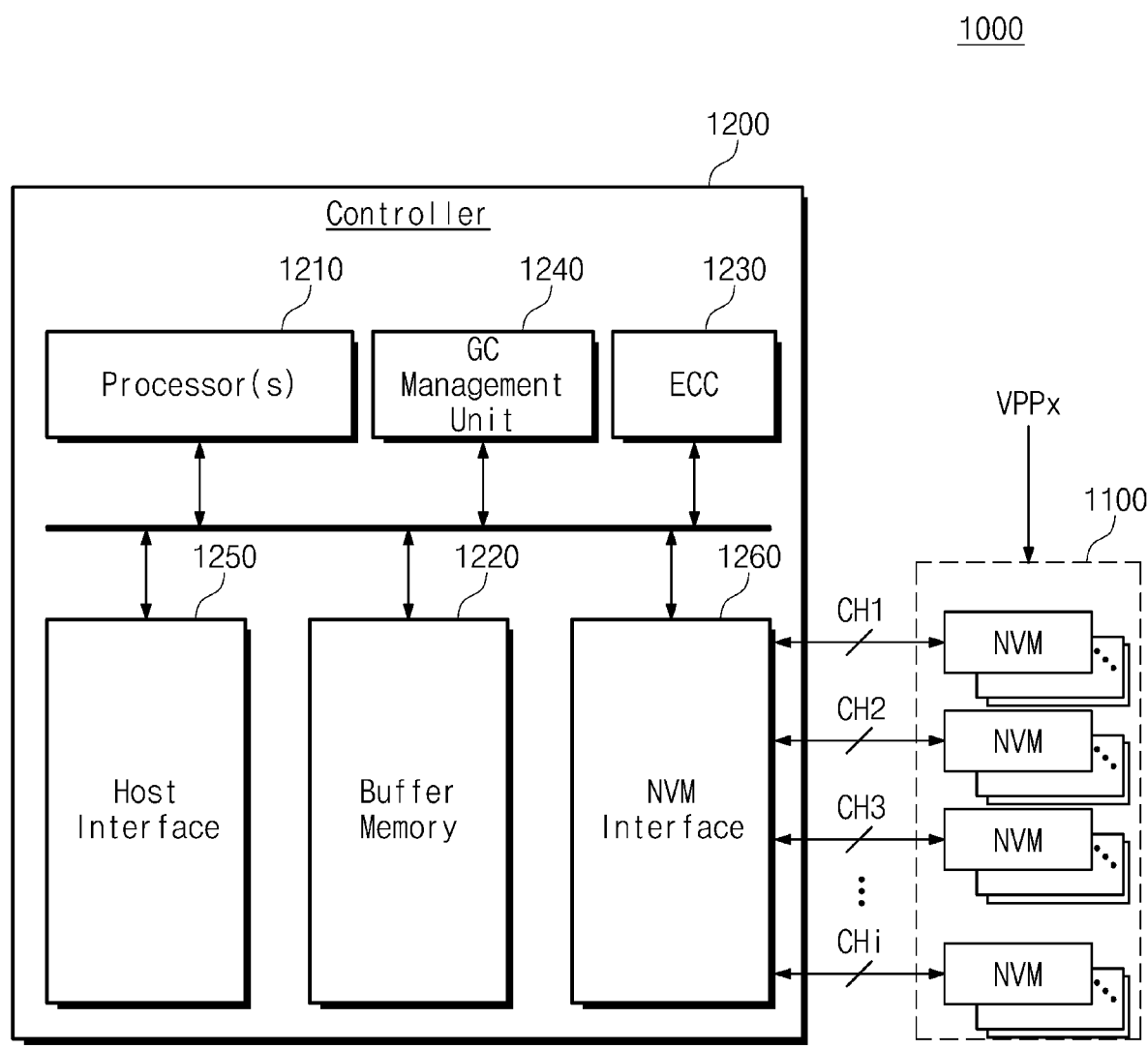
FIG. 13 is a block diagram schematically illustrating a solid state drive (SSD) according to an exemplary embodiment of the inventive concepts.
Figure 14:
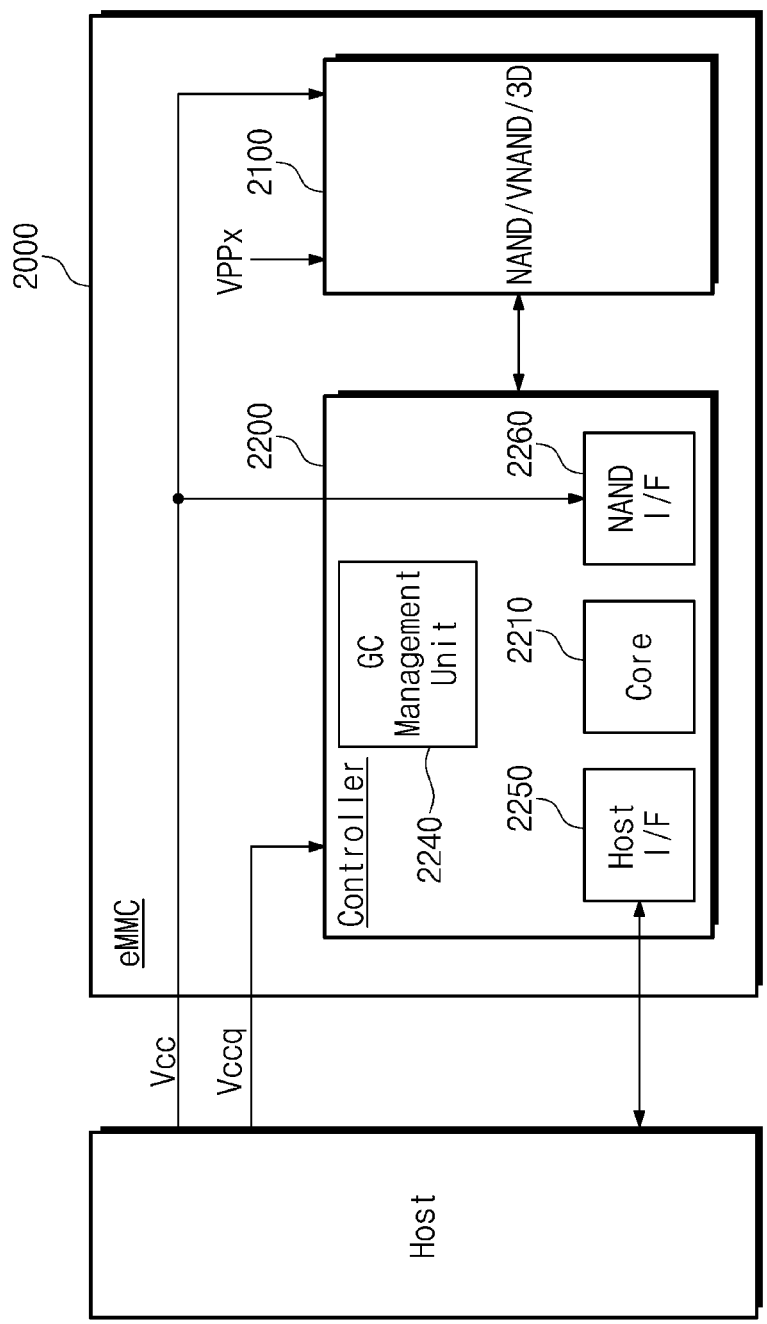
FIG. 14 is a block diagram schematically illustrating an embedded multimedia card (eMMC) according to an exemplary embodiment of the inventive concepts.

The memory controller 120 in the embodiment of FIG. 1 includes a host interface (HIF) 121, a garbage collection (GC) management unit 122, and a nonvolatile memory interface (NIF) 123. It will be understood that the memory controller may include other components not shown in FIG. 1 that are not directly pertinent to the present embodiment. For example, the memory controller may include a processor, a buffer memory, error correction coding (ECC) circuitry, a data bus system, and the like. FIGS. 13 and 14 presented later herein will discuss these and other components which may be contained in the memory controller 120.

The host interface 121 functions as a data interface with the host 200. For example, the host interface 121 may receive a user data write request (e.g., a write request without a data tag) including user data, or a metadata write request (e.g., a write request with a data tag) including metadata. As mentioned previously, a user data write request may be distinguished from a metadata write request by the absence (user data) or presence (metadata) of a given data tag.

The nonvolatile memory interface 123 functions as a data interface with the first and second block groups 111 and 112. In particular, access operations to the first and second block groups 111 and 112 are controlled by the controller 120 via the nonvolatile memory interface 123, and write data and read data are exchanged between the controller 120 and the first and second block groups 111 and 112 via the nonvolatile memory interface 123.

In a write operation, user data accompanying a user data write request is stored in the first block group 111 according to the present embodiment. On the other hand, metadata accompanying a metadata write request is stored in the second block group 112 according to the present embodiment.

The garbage collection management unit 122 of the controller 120 manages garbage collection operations with respect to the first block group 111 and the second block group 112. That is, as will be described in detail by way of example embodiments, the garbage collection management unit 122 is configured to execute a garbage collection policy that includes selecting for garbage collection a memory block among the first and second memory block groups 111 and 112, and executing garbage collection with respect to the selected memory block.

Figure 2:
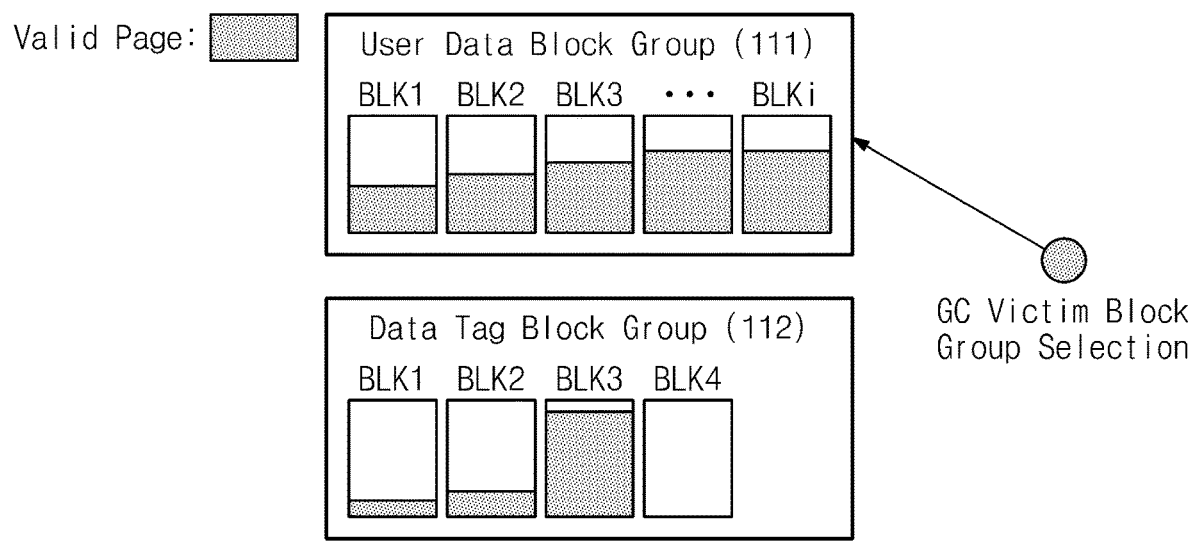
FIG. 2 is a diagram for reference in describing a method of selecting a garbage collection target of a storage device, according to an exemplary embodiment of the inventive concepts.

FIG. 2 is a diagram for reference in describing a garbage collection operation of the storage device 100 of FIG. 1 according to an exemplary embodiment of the inventive concept. In particular, FIG. 2 illustrates blocks of each of the first and second block groups 111 and 112, where the shaded portion of each block constitutes a valid page.

Generally, garbage collection may be automatically performed by the memory controller 120 as a background operation of memory management. In order perform garbage collection, a target memory block among the memory blocks of the first and second block groups 111 and 112 must be selected. The present embodiment of the inventive concept carries out a garbage collection policy which utilizes two different criteria for selection of a target block depending on the type of data stored in a block group. In the example of this embodiment, the first criteria relates to the cost of garbage collection, while the second relates to valid data characteristics.

The cost of garbage collection of this embodiment corresponds to the time expended in garbage collection. As such, in this example, the cost of garbage collection of each block corresponds to the number of valid pages of the block. This is because the garbage collection requires copying valid pages to a new block. The higher number of valid pages to be copied the higher the garbage collection time.

Referring to FIG. 2, block BLK1 of the second data block group 112 has the fewest valid pages, and thus it has the lowest garbage collection cost. Block BLK2 of the second data block group 112 has the second fewest valid pages, so it has the second lowest garbage collection costs. Block BLK1 of the first data block group 111 has the third fewest valid pages and therefore the third lowest garbage collection cost.

On the other hand, valid data characteristics associated with the second criterion of the example of this embodiment relate to the likelihood that valid data will remain valid for a relatively significant period of time. If not, the benefit of garbage collection (i.e., copying the valid data to another block) is reduced since the valid data is soon become obsolete or invalid data. In other words, even if the data was copied to another block, it is likely that the data would be updated before being read. In this disclosure, data of this type is referred to as data that can be erased without copying.

One example of metadata that may be erased without copying is journal data, such as ext4 journal data used in Android™ systems. Such journal data is generally characterized by being frequently and/or cyclically updated, and by being within a given address range and/or having a distinguishable data pattern.

Another embodiment of the inventive concepts for executing garbage collection will now be described with reference to the flowchart of FIG. 3. The method may be carried out by the garbage collection management unit 122 of the memory controller 120 of FIG. 1.

Figure 3:
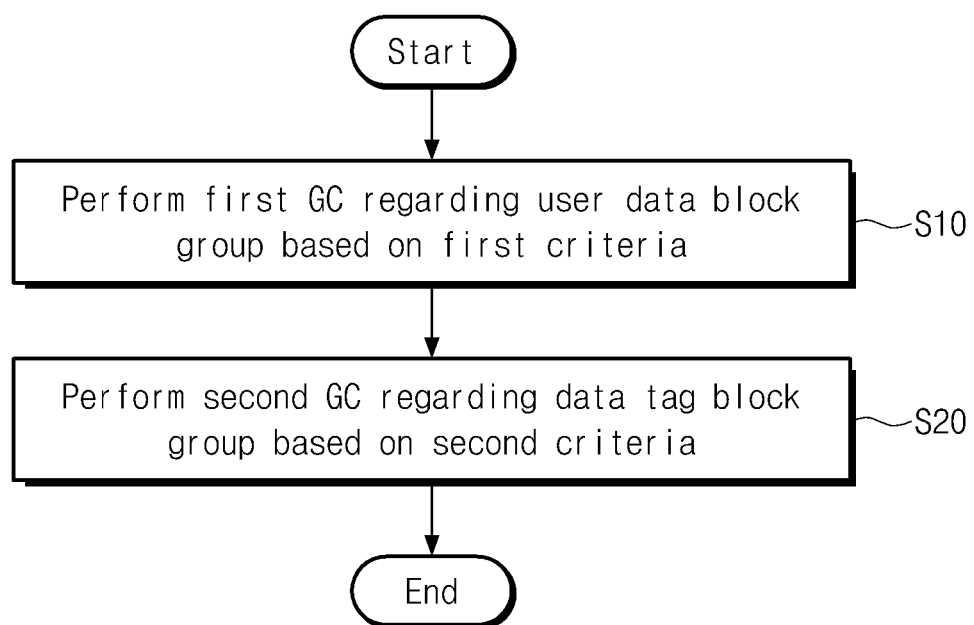
FIG. 3 is a flowchart for reference in describing a garbage collection method of a storage device according to an exemplary embodiment of the inventive concepts.

Referring to FIG. 3, a block among the user data block group 111 is selected as a garbage collection (GC) target block based on a first criterion (S10). In the example of this embodiment, the first criterion identifies the block having the lowest cost of garbage collection. In the example of FIG. 2, block BLK1 of the user data block group 111 meets the first criterion, i.e., it has the lowest cost of garbage collection since it has the fewest number of valid pages, regardless of the characteristics of data contained in the valid pages. As such, block BLK1 of the user data block group 111 is selected as the target block for garbage collection, and garbage collection is carried out with respect to that block.

On the other hand, referring to FIG. 3, at (S20) a block among the data tag block group 112 is selected as a garbage collection (GC) target block based on a second criterion which is different than the first criterion. Namely, in the example of this embodiment, the second criterion identifies the block having the fewest number of valid pages, but excludes blocks in which the valid pages thereof are deemed to contained data that can be erased without copying. In the example of FIG. 2, block BLK1 of the data tag block group 112 has the fewest number of valid pages. However, it is assumed here that the valid pages of the block BLK1 are deemed to contain data (e.g., journal data) that can be erased without copying as described above, and therefore block BLK1 does not meet the second criterion. In that case, block BLK1 would be excluded as the garbage collection target block. It is further assumed here that the valid pages of block BLK2 of the data tag block group 112 do not contain data that can be erased without copying. In that case, block BLK2 would meet the second criteria and would be selected as the target block for garbage collection, and garbage collection is carried out with respect to that block.

Whether the valid pages of a block of the data tag block group 112 are deemed to contain data that can be erased without copying may be determined from characteristics of the data. For example, a data pattern of the data may indicate that the metadata is journal data that is frequently updated. As another example, an address range of the data may indicate that the metadata is journal data that is frequently updated. It may be more efficient to exclude blocks of the data tag block group 112 from garbage collection that contain data that is likely to be updated or otherwise become obsolete.

Metadata of the data tag block group 112 is more likely than user data of the user data block group to be of the type that can be erased without copying. For this reason, the garbage collection criterion of the user data block group 111 is set to be different than that of the data tag block group 112. In this way, by tailoring the garbage collection criteria to the type of data stored in each block group, the overall efficiency of garbage collection may be enhanced.

It is noted that step S110 and S120 are shown in arbitrary order in FIG. 3, and these steps can be reversed. Also, each of steps S10 and S20 can be carried out multiple times prior to execution of the other step.

Figure 4:
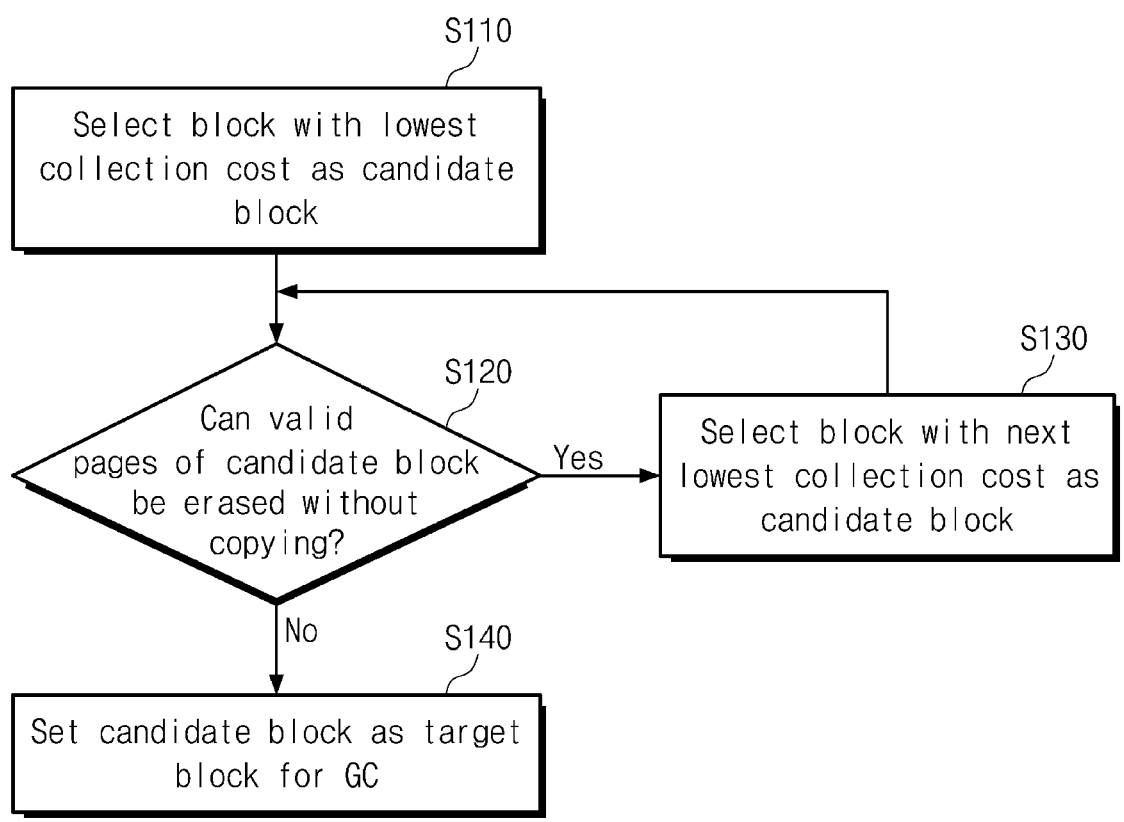
FIG. 4 is a flowchart for reference in describing a garbage collection method of a storage device according to another exemplary embodiment of the inventive concepts.

FIG. 4 is a flowchart schematically illustrating a garbage collection method of a storage device according to another exemplary embodiment of the inventive concept. The method may be carried out by the garbage collection management unit 122 of the memory controller 120 of FIG. 1. In the example of this embodiment, garbage collection includes selection of a target block from among two or more types of data block groups such as the user data block group 111 and the data tag block group 112 of FIG. 1.

Initially, a memory block among the data block groups having the lowest collection cost is selected as a candidate target block (S110). In the example illustrated in FIG. 2, block BLK1 among the block groups 111 and 112 has the fewest number of valid pages, and is therefore selected as a candidate target block having the lowest collection cost.

Next, a determination is made as to whether the valid pages of the candidate target block contain data that can be erased without copying (S120). For example, the valid pages of the candidate target block may contain data that is frequently updated, such as journal data. As such, resources may be wasted by copying such data to another memory block in a garbage collection operation.

In the case where the valid pages of the candidate target block contain data that can be erased without copying (YES at S120), a memory block among the data block groups having the next lowest collection cost is selected as a candidate target block (S130). In the example illustrated in FIG. 2, block BLK2 among the block groups 111 and 112 has the next fewest number of valid pages, and is therefore selected as a new candidate target block having the lowest collection cost. A determination is then made as to whether the valid pages of the new candidate target block contain data that can be erased without copying (S120). Steps S120 and S130 are repeated until a candidate target block is selected that does not contain data that can be erased without copying.

Once a candidate target block is selected that does not contain data that can be erased without copying (NO at S120), the candidate target block is set as the target block for garbage collection (S140), and garbage collection is then carried out with respect to the target block.

Figure 5:
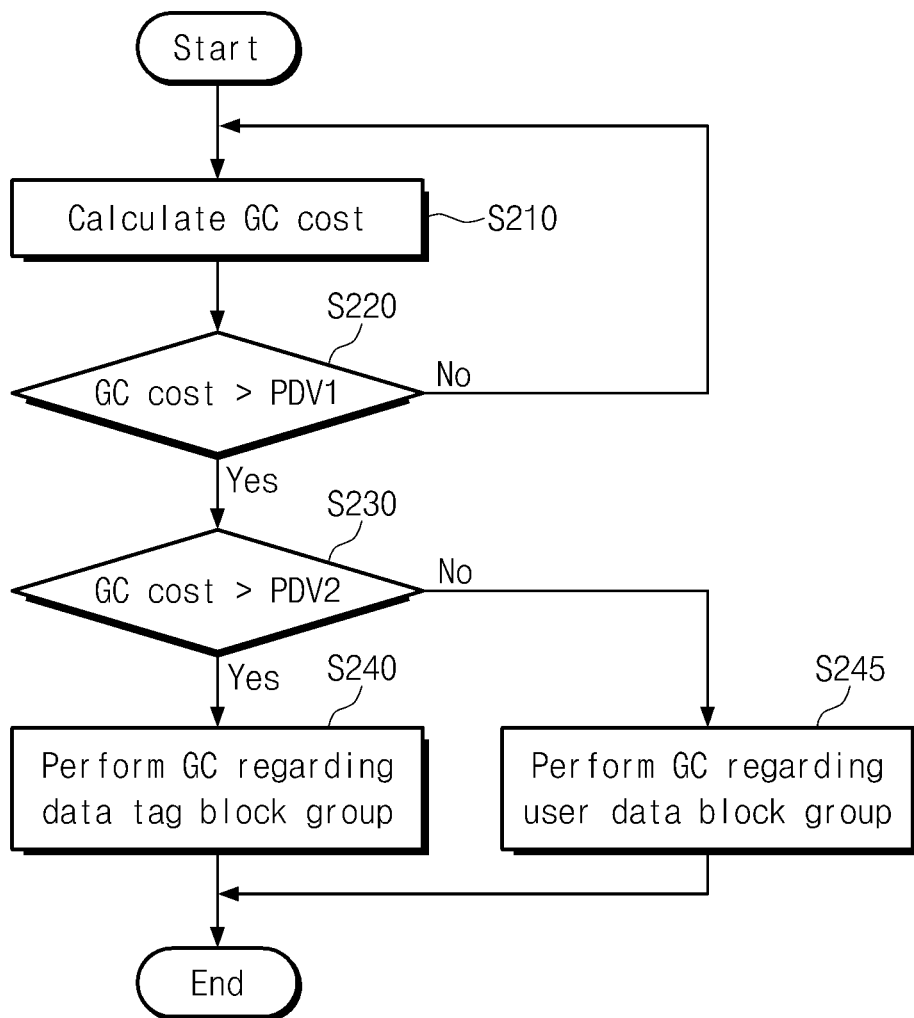
FIG. 5 is a flowchart for reference in describing a garbage collection method of a storage device according to still another exemplary embodiment of the inventive concepts.

FIG. 5 is a flowchart schematically illustrating a garbage collection method of a storage device according to another exemplary embodiment of the inventive concept. The method may be carried out by the garbage collection management unit 122 of the memory controller 120 of FIG. 1. In the example of this embodiment, garbage collection includes selection of a target block from among two or more types of data block groups such as the user data block group 111 and the data tag block group 112 of FIG. 1.

Initially, a cost of garbage collection (GC) is calculated, for example, based on the number of memory blocks to be used for the garbage collection and the number of free blocks to be generated by the garbage collection (S210).

Next, a determination is made as to whether the garbage collection cost calculated at S210 exceeds a first reference value PDV1 (S220). If not (NO at S220), the method returns to operation S210 as represented in FIG. 5.

If the calculated garbage collection cost does exceed the first reference value PDV1 (YES at S220), a determination is then made as to whether the cost of garbage collection exceeds a second reference value PDV2 (S230) which is greater than the first reference value PDV1.

If the calculated garbage collection cost does exceed the first reference value PDV1 but does not exceed the second reference value PDV2 (NO at S230), garbage collection is carried out with respect to the user data block group 111 (S245). On the other hand, if the calculated garbage collection cost exceeds both the first reference value PDV1 and the second reference value PDV2 (YES at S230), garbage collection is carried out with respect to the tag data block group 112 (S240). As such, the embodiment of FIG. 5 is characterized by selecting either the user data block group 111 or the data tag block group 112 for garbage collection based on the cost of garbage collection.

Figure 6:
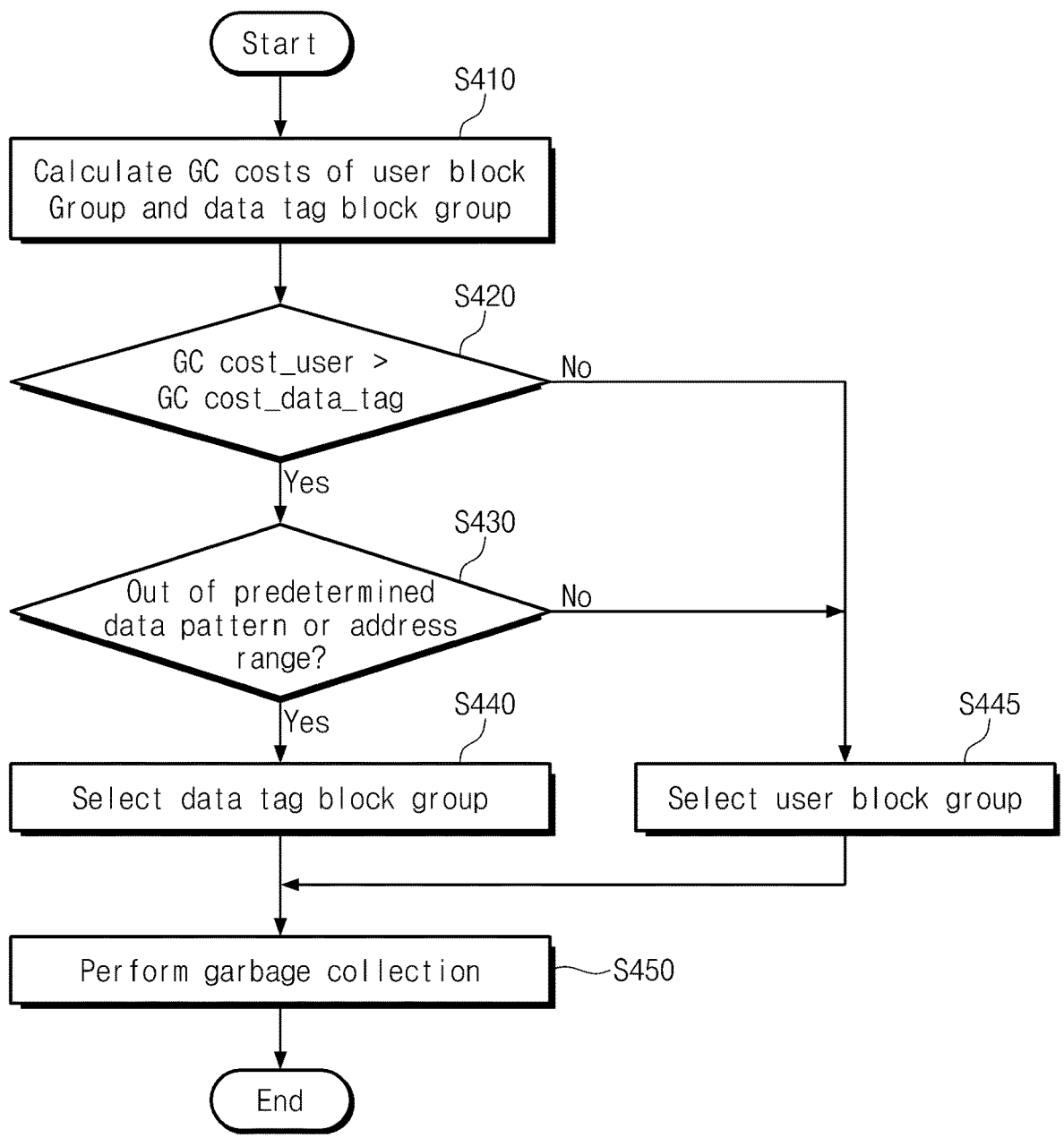
FIG. 6 is a flowchart for reference in describing a garbage collection method of a storage device according to a further exemplary embodiment of the inventive concepts.

FIG. 6 is a flowchart schematically illustrating a garbage collection method of a storage device according to another exemplary embodiment of the inventive concept. The method may be carried out by the garbage collection management unit 122 of the memory controller 120 of FIG. 1. In the example of this embodiment, garbage collection includes selection of a target block from among two or more types of data block groups such as the user data block group 111 and the data tag block group 112 of FIG. 1.

Initially, a garbage collection (GC) cost of the user data block group 111 and a garbage collection cost of the tag data block group 112 are calculated (S410). In the example of this embodiment, the garbage collection cost of the user data block group 111 may correspond to the number of valid pages of a user data block having the fewest valid pages (e.g., the number of valid pages of BLK1 of block group 111 of FIG. 2). Likewise, in the example of this embodiment, the garbage collection cost of the data block group 112 may correspond to the number of valid pages of a tag data block having the fewest valid pages (e.g., the number of valid pages of BLK1 of block group 112 of FIG. 2).

A determination is then made as to whether the garbage collection (GC) cost of the user data block group 111 (GC cost_user) is greater than the garbage collection cost of the tag data block group 112 (GC cost_data_tag) (S420). For example, FIG. 2, GC cost_user may be greater than GC cost_data_tag since BLK1 of the user data block group 111 has more valid pages than BLK1 of the tag data block group 112.

In the case where the garbage collection (GC) cost of the user data block group 111 (GC cost_user) is not greater than the garbage collection cost of the tag data block group 112 (GC cost_data_tag) (i.e., NO at S420), garbage collection of the target block of the user data block group 111 is selected (S445) and then garbage collection is performed (S450). For example, contrary to what is shown in FIG. 2, if the user data block BLK1 of the data block group 111 had fewer valid pages than the tag data block BLK1 of the tag data block group 112, garbage collection may be executed with respect to the user data block BLK1 of the data block group 111.

On the other hand, in the case where the garbage collection (GC) cost of the user data block group 111 (GC cost_user) is greater than the garbage collection cost of the tag data block group 112 (GC cost_data_tag) (i.e., YES at S420), at determination is made as to whether the valid data of the target memory block of the data tag block group 112 is outside of a predetermined data pattern and/or address range (S430). As mentioned previously, certain types of data such as journal data within a predetermined address range or having a distinguishable data pattern may be frequently updated. As such, given the frequent updating, it may be a waste of resources to copy such data in a garbage collection operation.

According to the present embodiment, if the valid data of the target block of the tag data block group 112 is within the predetermined address range (NO at S430), the user data block group 111 is selected (S445) for garbage collection, and then garbage collection is performed at S450. This is the case even though the user data block group 111 has a higher garbage collection cost than the tag data block group 112.

On the other hand, if the valid data of the target block of the tag data block group 112 falls outside the predetermined address range (YES at S430), the tag data block group 112 is selected (S440) for garbage collection, and then garbage collection is performed at S450.

Figure 7:
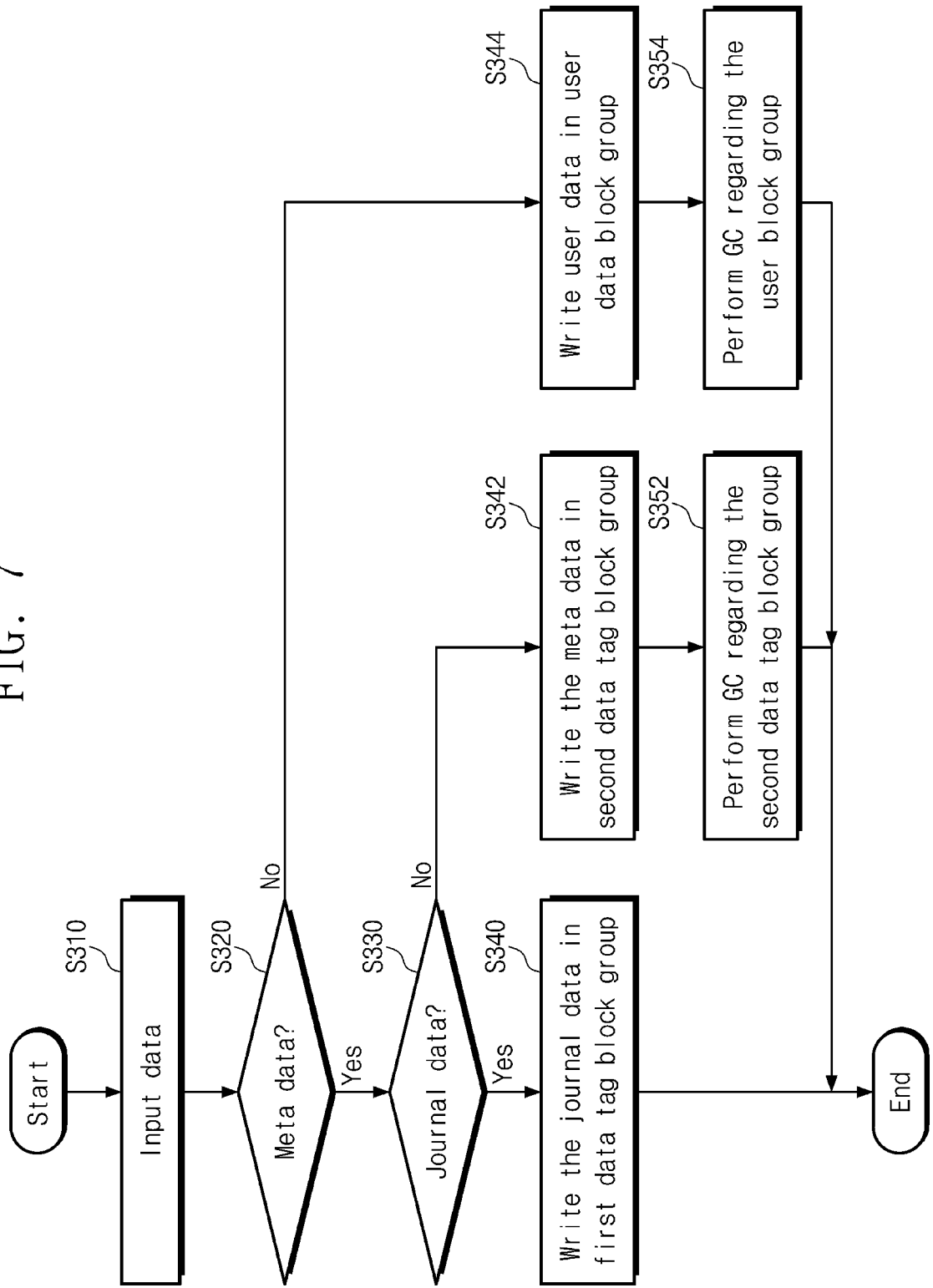
FIG. 7 is a flowchart for reference in describing a garbage collection method of a storage device according to a further exemplary embodiment of the inventive concepts.

FIG. 7 a flowchart schematically illustrating a garbage collection method of a storage device according to another exemplary embodiment of the inventive concept. The method may be carried out by the garbage collection management unit 122 of the memory controller 120 of FIG. 1. However, in contrast to the configuration of FIG. 1, the storage device of this embodiment includes two different types of data tag block groups which are subject to different garbage collection policies.

Initially, the host interface 121 of the storage device 100 may receive input data, corresponding to a write request, from the host 200 (S310).

Next, the memory controller 120 determines whether the received input data is metadata (S320). As explained previously, metadata may be identified by the presence of a data tag. In this case, the input data may be determined as being metadata if it contains a data tag, although the inventive concepts are not limited in this manner.

If the input data is determined not to be metadata (NO at S320) (e.g., the input data does not include the data tag), then the input data is written as user data in a user data block group of the storage device 100 (S344).

If the input data is determined to be metadata (YES at 320), then the memory controller 12 makes a determination as to whether the metadata is journal data. As explained previously, journal data may correspond to a predetermined address range or a predetermined data pattern. In this case, the memory controller may determine whether the metadata is journal data based on an address range of the journal data.

If the metadata is not journal data (NO at S330) (e.g., the input data is not within a predetermined address range), then the input data is written as metadata in a second data tag block group of the storage device 100 (S342).

On the other hand, if the metadata is journal data (YES at S330) (e.g., the input data is within a predetermined address range), then the input data is written as journal data in a first data tag block group of the storage device 100 (S340).

As represented in FIG. 7, the metadata of the second data tag block group is subject to garbage collection (S352), and the user data of the user data block group is subject to garbage collection (S354). The garbage collection policies at S352 and S354 may be carried out as described in relation to other embodiments herein, although the embodiment of FIG. 7 is not limited by the garbage collection policies adopted at S352 and S354.

In contrast, the journal data of the first data tag block group is not subject to garbage collection. As described previously, journal data is frequently updated. As such, according to the present embodiment, garbage collection of the first data tag block group is inhibited to avoid wasting resources on copying of journal data that will soon be updated. Instead, the blocks are first data tag block group are simply erased, for example, when they lack valid data.

Another embodiment of the inventive concepts will now be described with reference to the diagram of FIG. 8. The method may be carried out by the garbage collection management unit 122 of the memory controller 120 of FIG. 1.

Figure 8:
FIG. 8 is a diagram reference in describing an over provision area based on garbage collection according to an exemplary embodiment of the inventive concepts.
Figure 8:
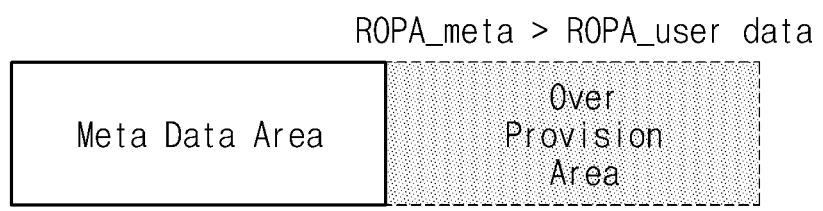

FIG. 8 is a diagram schematically illustrating a change in an over provision area due to garbage collection according to an exemplary embodiment of the inventive concept. Referring to FIG. 8, the host 200 may recognize the storage device 100 as including a user data area and a metadata area.

However, the storage device 100 may further include the over provision areas in the user data area and the metadata area.

In this embodiment of the inventive concepts, the relative strictness of the garbage collection policies of the user data block group and the tag data block group are adaptively set based on a relative size of an over provision area of each block group. That is, the garbage collection of the storage device 110 may be performed under the condition that stricter criteria are applied to the user data block group 111 or data tag block group 112 having the smaller over provision area. In the example of FIG. 8, the garbage collection criteria for the user data block group 111 may be stricter than that of the data tag block group 112 since the over provision area rate ROPA_meta of the data tag block group 112 is greater than the over provision area rate ROPA_normal of the user data block group 111.

Figure 9:
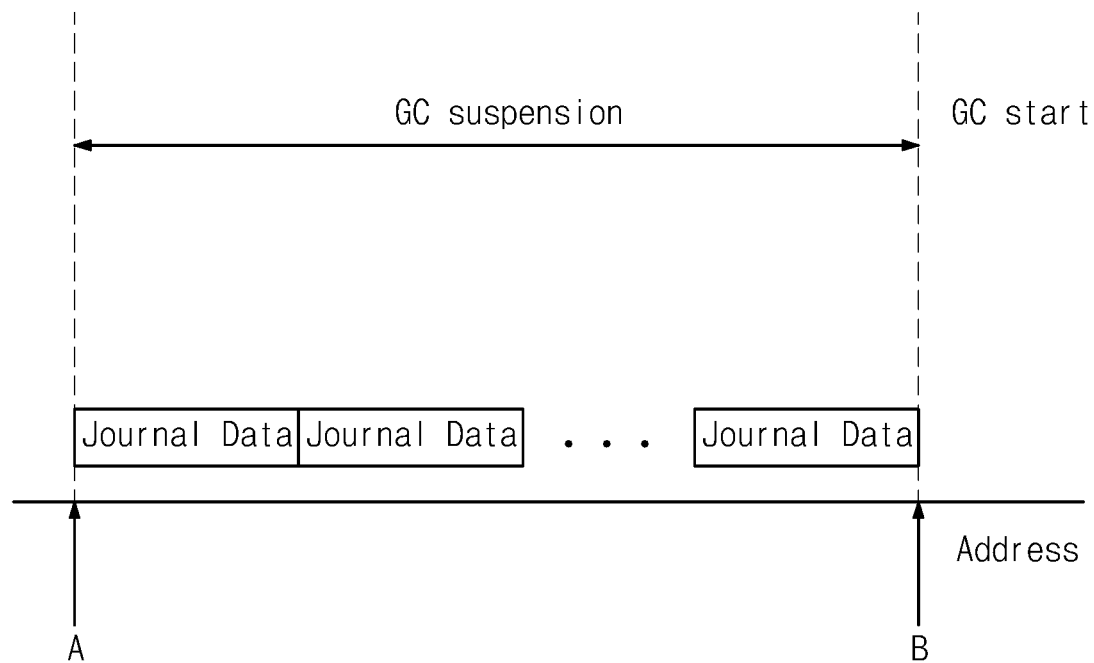
FIG. 9 is a diagram for reference in describing a garbage collection criteria for a data tag block group according to an exemplary embodiment of the inventive concepts.

FIG. 9 is a block diagram schematically illustrating a garbage collection criterion of a data tag block group according to an exemplary embodiment of the inventive concept. Referring to FIG. 9, garbage collection of tag data in an address range of A to B may be deferred or inhibited since it is deemed to be journal data. In an embodiment of the inventive concepts, the address range of A to B may be determined in advance between the storage device 100 and the host 200.

The journal data may be updated repetitively in a specific address range of A to B. Even though a garbage collection request is issued at a point in time, the garbage collection may not be performed when a garbage collection target is the journal data in the specific address range of A to B. As described previously, the journal data may be updated later in which case the previous journal data is invalidated. If the garbage collection is performed at this time, the garbage collection cost which will be consumed in the future may be relatively high. Therefore, the garbage collection method according to this embodiment of the inventive concept may start garbage collection of the journal data when the tag data outside of the address range of A to B is received.

Various memory configurations and systems will now be described in which the previously described embodiments of the inventive concepts may be adopted.

As mentioned previously, the NVM device or devices of the inventive concepts containing the normal and data tag block groups 111 and 112 may include one or more three-dimensional (3D) memory cell arrays. In this case, the 3D memory cell arrays may be monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In addition, the 3D memory cell array or arrays may include vertical NAND strings that are vertically oriented such that at least one memory cell is located over another memory cell relative to the surface of the substrate. The at least one memory cell may include a charge trap layer. Also, each vertical NAND string may include at least one selection transistor located over and/or below the memory cells of the string relative to the surface of the substrate. The at least one selection transistor may have the same structure as the memory cells and may be formed monolithically together with the memory cells.

The following patent documents, which are hereby incorporated by reference, describe suitable configurations for 3D memory cell arrays, in which the 3D memory cell array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

Although a charge trap layer is mentioned above, it is noted that the inventive concepts may be applied to both a flash memory in which a conductive floating gate is used as a charge storage layer, and a charge trap flash (CTF) in which an insulating layer is used as a charge storage layer.

Figure 10:
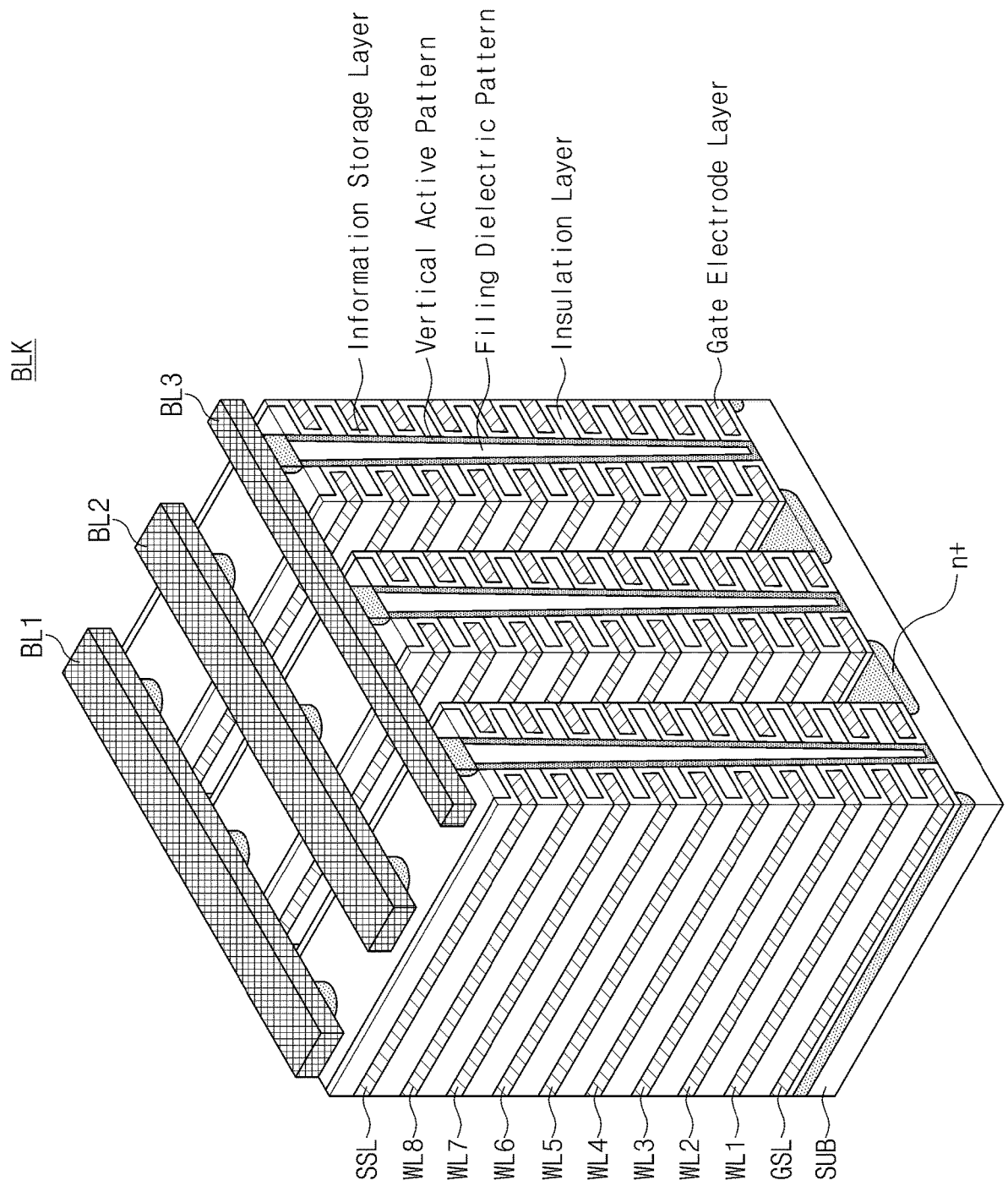
FIG. 10 is a perspective view of a memory block of a storage device according to an exemplary embodiment of the inventive concepts.

FIG. 10 is a block diagram schematically illustrating a memory block of a storage device according to an exemplary embodiment of the inventive concept. Referring to FIG. 10, at least one ground selection line GSL, a plurality of word lines WL1 to WL8, and at least one string selection line SSL may be stacked on a substrate in a plate shape. Here, the at least one string selection line SSL may be separated by a string selection line cut. In an exemplary embodiment of the inventive concept, at least one dummy word line may be stacked in a plate shape between the ground selection line GSL and the word lines WL1 to WL8 or may be stacked in a plate shape between the word lines WL1 to WL8 and the string selection line SSL. Although not shown, each word line cut may include a common source line. In an exemplary embodiment of the inventive concepts, the common source lines included in word line cuts may be connected in common. A string may be formed by making a pillar, connected to a bit line, penetrate the ground selection line GSL, the word lines WL1 to WL8, and the string selection line SSL.

In FIG. 10, an embodiment of the inventive concepts is exemplified as the memory block BLK includes eight word lines WL1 to WL8. However, the scope and spirit of the inventive concept may not be limited thereto.

Figure 11:
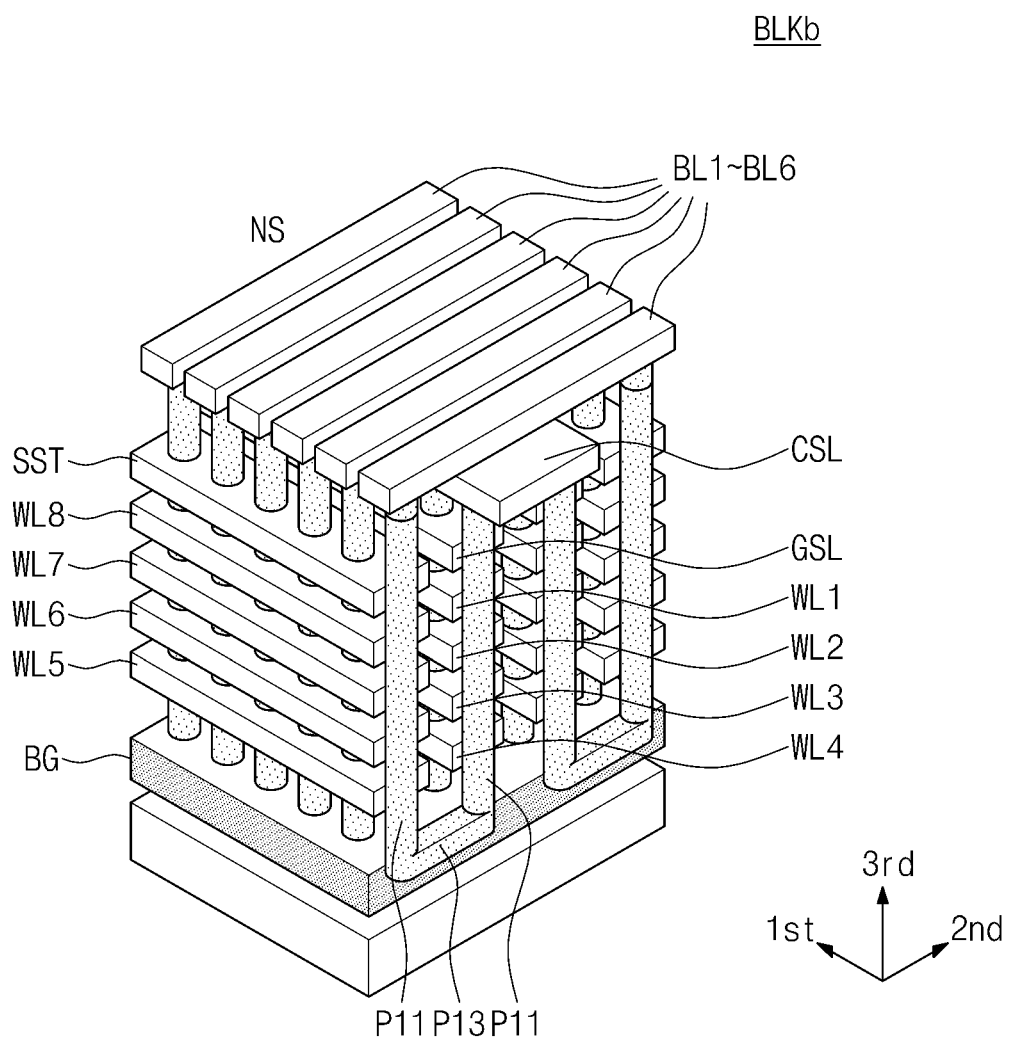
FIG. 11 is a perspective view of a memory block according to another exemplary embodiment of the inventive concepts.

FIG. 11 is a block diagram schematically illustrating a memory block according to another exemplary embodiment of the inventive concepts. Referring to FIG. 11, for convenience of description, an embodiment of the inventive concept is exemplified as the number of stacked word lines of a memory block BLKb is 4. The memory block BLKb may be implemented to have a pipe-shaped bit cost scalable (PBiCS) structure in which adjacent lower ends of serially connected memory cells are connected to each other. The memory block BLKb may include m-by-n strings NS (m and n being integer numbers).

In FIG. 11, an embodiment of the inventive concepts is exemplified as m=6 and n=2. Each string NS may include serially connected memory cells MC1 to MC8. Here, a first upper end of memory cells MC1 to MC8 may be connected to a string selection transistor SST, a second upper end of memory cells MC1 to MC8 may be connected to a ground selection transistor GST, and a lower end of memory cells MC1 to MC8 may be connected to a pipe.

Memory cells constituting a string NS may be formed by stacking a plurality of semiconductor layers. Each string NS may include a first pillar P11, a second pillar P12, and a pillar connection part P13 which connects the first pillar P11 and the second pillar P12. The first pillar P11 may be connected to a bit line (e.g., BL1) and the pillar connection part P13 and may be formed by passing through the string selection line SSL and word lines WL5 to WL8. The second pillar P12 may be connected to the common source lines CSL and the pillar connection part P13 and may be formed by passing through the ground selection line GSL and word lines WL1 to WL4. As shown in FIG. 10, the string NS may be implemented with the U-shaped pillar.

In an exemplary embodiment of the inventive concepts, a back gate BG may be formed on a substrate and the pillar connection P13 may be implemented inside the back gate BG. In an exemplary embodiment of the inventive concept, the back gate BG may be used in common in the block BLKb. The back gate BG may be separated from a back gate BG of another block.

Figure 12:
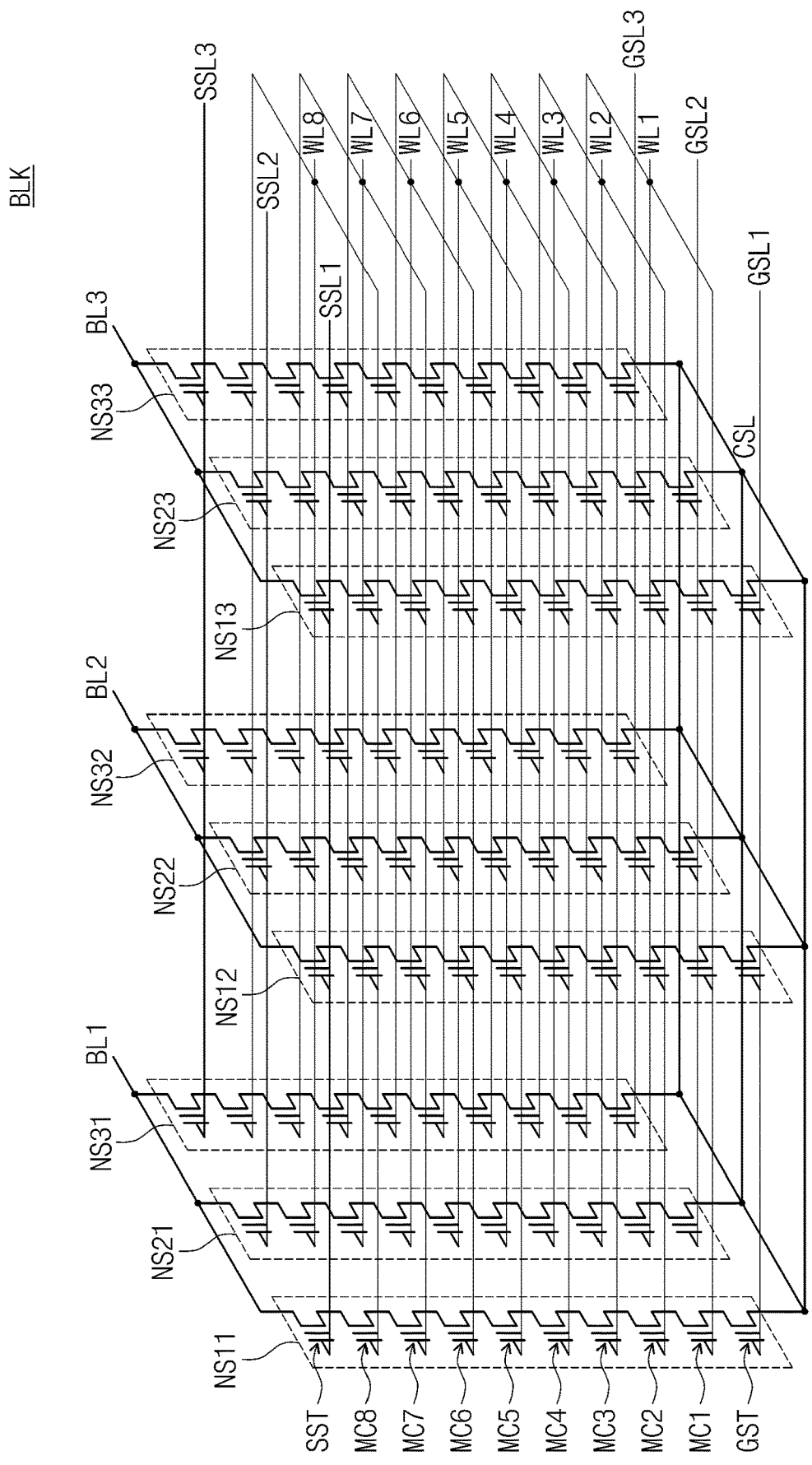
FIG. 12 is a circuit diagram of a memory block according to an exemplary embodiment of the inventive concepts.

FIG. 12 is a circuit diagram schematically illustrating a memory block BLK according to an exemplary embodiment of the inventive concepts. Referring to FIG. 12, a memory block BLK may include strings connected to a plurality of bit lines BL1 to BL3 (n being an integer of 2 or more). Here, each string may have at least one string selection transistor SST, a plurality of memory cells MC1 to MC8 (m being an integer of 2 or more), and at least one ground selection transistor GST, which are serially connected between the bit line and a common source line CSL. Each of the memory cells MC1 to MC8 may store at least one or more bits of data. Even though not shown, each string may further include at least one dummy cell disposed between the string selection transistor SST and the memory cells MC1 to MC8 and at least one dummy cell disposed between the memory cells MC1 to MC8 and the ground selection transistor GST.

It may be understood that the numbers of word lines, bit lines, memory cells, string selection lines, and ground selection lines are not limited to an exemplification illustrated in FIG. 12.

An exemplary embodiment of the inventive concepts may be applicable to a solid state drive (SSD).

FIG. 13 is a block diagram schematically illustrating a solid state drive (SSD) according to an exemplary embodiment of the inventive concept. Referring to FIG. 13, a solid state drive (SSD) 1000 may include a plurality of nonvolatile memory devices 1100 and an SSD controller 1200.

The nonvolatile memory devices 1100 may be implemented to receive an external high voltage Vpp optionally. A part of the nonvolatile memory devices 1100 may constitute the first block group 111 and a part or all of remaining nonvolatile memory devices 1100 may constitute the second block group 112.

The SSD controller 1200 may be connected to the nonvolatile memory devices 1100 through a plurality of channels CH1 to CHi (i being an integer of 2 or more)

The SSD controller 1200 may include at least one processor 1210, a buffer memory 1220, an error correction circuit 1230, a garbage collection management unit 1240, a host interface 1250, and a nonvolatile memory interface 1260.

The buffer memory 1220 may store data required for the operation of the memory controller 1200 temporarily. The buffer memory 1220 may include a plurality of memory lines in which data or instructions are stored. Here, the plurality of memory lines may be mapped into cache lines in various ways. In FIG. 13, the buffer memory 1220 according to an embodiment of the inventive concept may be located inside the memory controller 1200. However, the scope and spirit of the inventive concept may not be limited thereto. For example, the buffer memory 1220 according to an embodiment of the inventive concept may be located outside the memory controller 1200.

The error correction circuit 1230 may calculate an error correction code value about data to be programmed in a write operation, may correct an error of data read in a read operation based on the error correction code value, and may correct an error about data recovered from the nonvolatile memory device 1100 in the data recovery operation. The error correction circuit 1230 may generate error correction code (ECC) to correct a fail bit or an error bit about data received from the nonvolatile memory device 1100. The error correction circuit 1230 may perform error correction encoding about data to be provided to the nonvolatile memory device 1100 and may generate data with a parity bit. The parity bit may be stored in the nonvolatile memory device 1100. Also, the error correction circuit 1230 may perform error correction decoding about data outputted from the nonvolatile memory device 1100. The error correction circuit 1230 may correct an error using the parity. The error correction circuit 1230 may correct an error using one of coded modulations such as a low density parity check (LDPC) code, a BCH code, a turbo code, a Reed-Solomon code, a convolution code, a recursive systematic code (RSC), a trellis-coded modulation (TCM), a block coded modulation (BCM), or the like.

Even though not shown, a code memory to store code data required to operate the memory controller 1200 may be further included. The code memory may be implemented with a nonvolatile memory device.

The garbage collection management unit 1240 may be implemented with the garbage collection management unit 122 shown in FIG. 1. The garbage collection management unit 1240 may be implemented to perform garbage collection about user data and metadata individually or independently.

The host interface 1250 may provide an interface with an external device. The host interface 1250 may be connected to a host through one of interfaces such as a parallel advanced technology attachment (PATA) bus, a serial advanced technology attachment (SATA) bus, a small computer system interface (SCSI), an universal serial bus (USB), a peripheral component interconnect express (PCIe), a Secure Digital (SD), a serial attached SCSI (SAS), universal flash storage (UFS), a NAND interface, and the like.

The nonvolatile memory interface 1260 may provide an interface with the nonvolatile memory device 1100. Even though now shown, the memory controller 1200 may include a wireless communication function (e.g., wireless-friendly (Wi-Fi)).

The SSD 1000 according to an embodiment of the inventive concepts may select and perform garbage collection about either user data or metadata individually, thereby achieving the optimized performance.

Exemplary embodiments of the inventive concept may be applicable to an embedded multimedia card (eMMC), moviNAND, and iNAND™. FIG. 14 is a block diagram schematically illustrating an embedded multimedia card (eMMC) according to an exemplary embodiment of the inventive concept. Referring to FIG. 14, an eMMC 2000 may include at least one NAND flash memory device 2100 and a controller 2200.

The NAND flash memory device 2100 may be implemented with at least one NAND flash memory device, which has one or both of the first bock group 111 and the second bock group 112.

The memory controller 2200 may be connected to the NAND flash memory device 2100 through a channel. The memory controller 2200 may be implemented with the memory controller 120 shown in FIG. 1.

The memory controller 2200 may include at least one controller core 2210, a garbage collection management unit 2240, a host interface 2250, and a NAND interface 2260. The at least one controller core 2210 may control an overall operation of the eMMC 2000.

The garbage collection management unit 2240 may be implemented with the garbage collection management unit 122 shown in FIG. 1. The host interface 2250 may provide an interface between a host and the controller 2200. The NAND interface 2260 may provide an interface between the NAND flash memory device 2100 and the controller 2200. In an embodiment of the inventive concept, the host interface 2250 may be a parallel interface (e.g., MMC interface). In another embodiment of the inventive concept, the host interface 2250 may be a serial interface (e.g., ultra-high speed-II (UHS-II) bus interface or UFS interface). In a further embodiment of the inventive concept, the host interface 2250 may be a NAND interface.

The eMMC 2000 may receive power supply voltages Vcc and Vccq from the host. Here, the power supply voltage Vcc (e.g., 3.3 V) may be provided to the NAND flash memory device 2100 and the NAND interface 2260 and the power supply voltage Vccq (e.g., 1.8 V/3.3 V) to the controller 2200. In an embodiment of the inventive concept, the eMMC 2000 may receive an external high voltage Vpp optionally.

The eMMC 2000 according to an embodiment of the inventive concepts may perform garbage collection about journal data separately, thereby extending a life of the NAND flash memory device.

Figure 15:
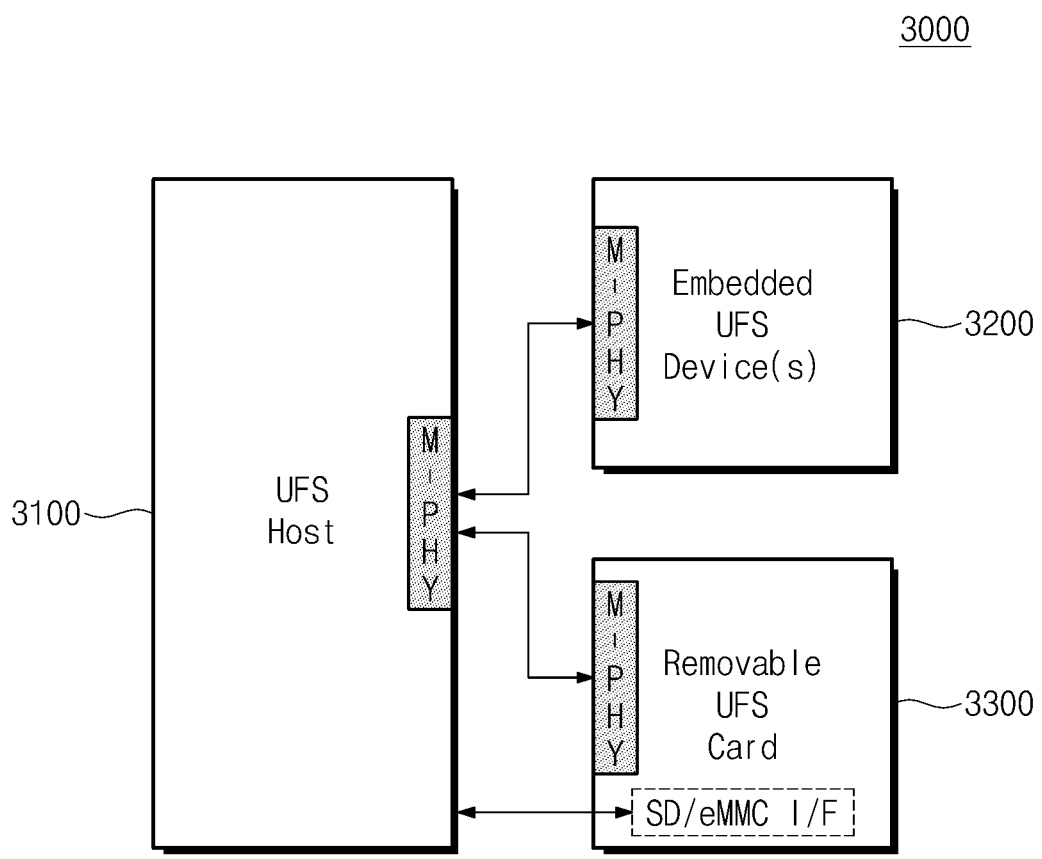
FIG. 15 is a block diagram schematically illustrating universal flash storage (UFS) system according to an exemplary embodiment of the inventive concepts.

Exemplary embodiments of the inventive concepts may be applicable to universal flash storage (UFS). FIG. 15 is a block diagram schematically illustrating an UFS system according to an exemplary embodiment of the inventive concept. Referring to FIG. 15, a UFS system 3000 may include an UFS host 3100, at least one embedded UFS device 3200, and a removable UFS card 3300. The communication between the UFS host 3100 and the embedded UFS device 3200 and between the UFS host 3100 and the removable UFS card 3300 may be carried out through the M-PHY layer.

At least one of the embedded UFS device 3200 or the removable UFS card 3300 may be implemented with the storage device 100 shown in FIG. 1.

Meanwhile, the UFS host 3100 may include a bridge which makes it possible to communicate with the removable UFS card 3300 using a policy different from an UFS policy. The UFS host 3100 may communicate with the removable UFS card 3300 using various card policies (e.g., USB flash drives (UFDs), MMC, eMMC, SD, mini SD, Micro SD, and the like).

Figure 16:
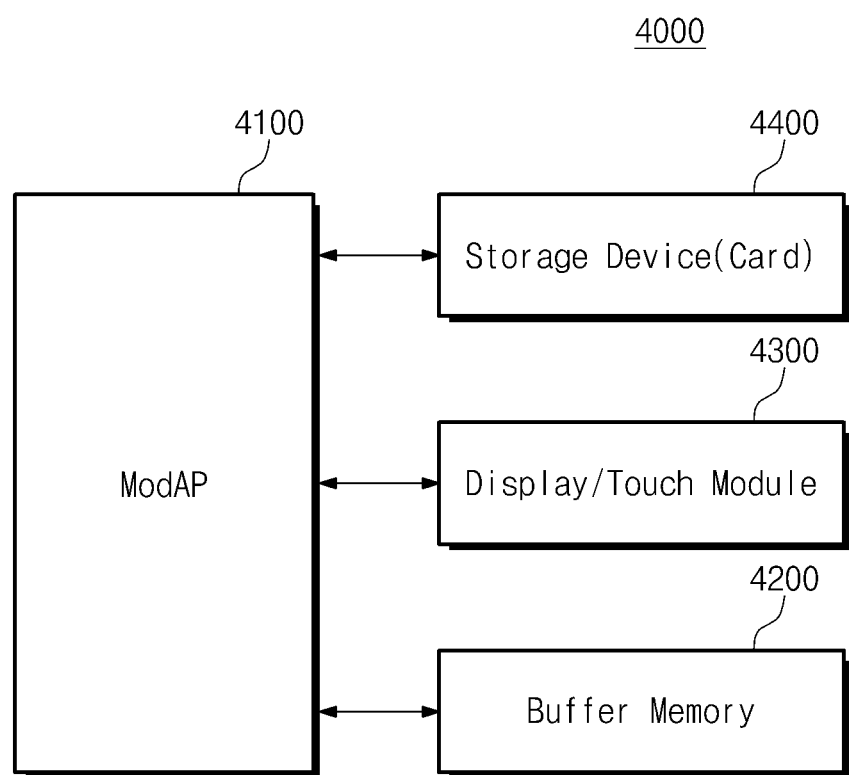
FIG. 16 is a block diagram schematically illustrating a mobile device according to an exemplary embodiment of the inventive concepts.

Exemplary embodiments of the inventive concept may be applicable to a mobile device. FIG. 16 is a block diagram schematically illustrating a mobile device 4000 according to an exemplary embodiment of the inventive concepts. Referring to FIG. 16, a mobile device 4000 may include an integrated processor (ModAP) 4100, a buffer memory 4200, a display/touch module 4300, and a storage device 4400.

The integrated processor ModAP 4100 may be implemented to control an overall operation of the mobile device 4000 and the wired/wireless communications with the outside. The buffer memory 4200 may be implemented to store data required for processing operations of the mobile device 4000 temporarily. The display/touch module 4300 may be implemented to display data processed by the ModAP 4100 and to receive data from the touch panel. The storage device 4400 may be implemented to store user's data. The storage device 4400 may be one of devices such as eMMC, SSD, or UFS. As described with reference to FIGS. 1 to 14, the storage device 4400 may perform garbage collection based on the garbage collection policy which is determined according to the attributes of data.

The mobile device 4000 according to an embodiment of the inventive concept may perform the optimized garbage operation, thereby achieving the optimized operational performance.

Figure 17:
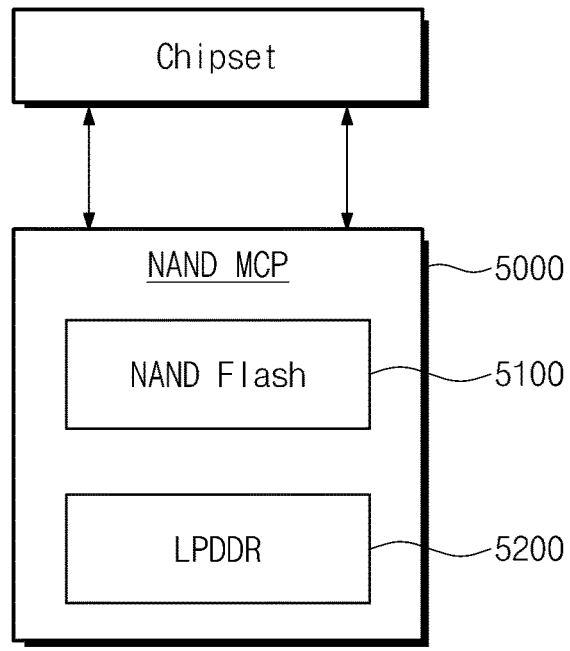
FIG. 17 is a block diagram schematically illustrating a NAND multi-chip package (MCP) according to an exemplary embodiment of the inventive concepts.

FIG. 17 is a block diagram schematically illustrating a NAND multi-chip package (MCP) 5000 according to an exemplary embodiment of the inventive concepts. Referring to FIG. 17, a NAND MCP may be a single package including a NAND flash memory device 5100 and a low power double data rate (LPDDR) memory device 5200.

The NAND flash memory device 5100 may include the normal block group 111 and the data tag block group 112 as shown in FIG. 1. The LPDDR memory device 5200 may be a mobile synchronous dynamic random access memory (SDRAM).

A chipset may manage the NAND flash memory device 5100 and the LPDDR memory device 5200 individually. Especially, the chipset may manage garbage collection about the NAND flash memory device 5100 using the garbage collection policy described with reference to FIGS. 1 to 3.

Figure 18:
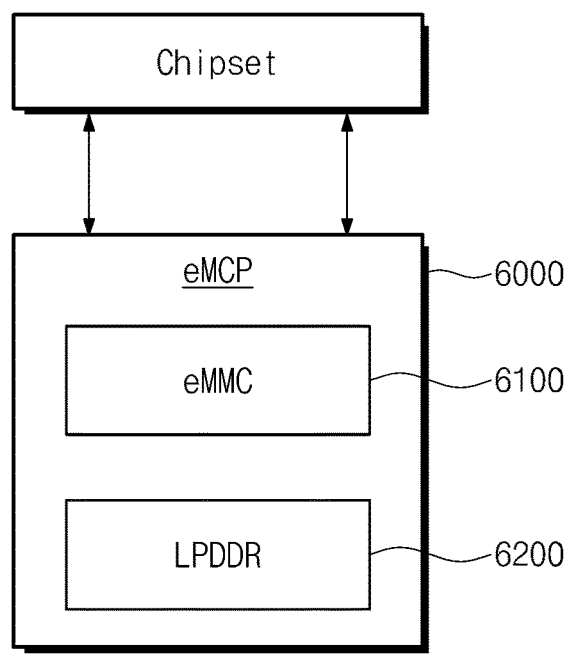
FIG. 18 is a block diagram schematically illustrating an embedded MCP (eMCP) according to an exemplary embodiment of the inventive concepts.

FIG. 18 is a block diagram schematically illustrating an embedded MCP (eMCP) 6000 according to an exemplary embodiment of the inventive concepts. Referring to FIG. 18, an eMCP 6000 may be a single package in which an eMMC 6100 and a LPDDR memory device 6200 are embedded. The eMMC 6100 may be implemented with the eMMC 2000 as shown in FIG. 14. The LPDDR memory device 6200 may be a mobile SDRAM. The chipset may manage the eMCP 6000.

According to an embodiment of the inventive concepts, the host may apply different garbage collection criteria to the data block groups based on the property of writing pattern of the data tag, in an environment that specific data groups can be written based on the data tag. For example, if blocks of which the number exceeds a writing address range of block groups specified by the data tag are not allocated, the blocks may be excluded from a garbage collection target even though the garbage collection is requested.

A memory system or a storage device according to an exemplary embodiment of the inventive concepts may be packaged according to any of a variety of different packaging technologies. Examples of such packaging technologies may include the following: package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), small outline (SOIC), shrink small outline package (SSOP), thin small outline (TSOP), thin quad flatpack (TQFP), system in package (SIP), multi-chip package (MCP), wafer-level fabricated package (WFP), and wafer-level processed stack package (WSP).

The storage devices described above may be applicable to mobile devices such as a smartphone, a wearable watch, a smart glass, and the like.

While the inventive concepts have been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A memory controller, comprising:
a host interface configured to connect to a host;
a nonvolatile memory interface configured to connect to a nonvolatile memory; and
a garbage collection management unit configured to execute a garbage collection policy with respect to first and second memory block groups of the nonvolatile memory,
wherein the first memory block group stores a first type of data and the second memory block group stores a second type of data, and
wherein the garbage collection policy comprises
determining a garbage collection cost for each of the first and second memory block groups,
determining whether the garbage collection cost of the first memory block group is greater than the garbage collection cost of the second memory block group,
executing garbage collection of the first memory block group when the garbage collection cost of the first memory block group is less than the garbage collection cost of the second memory block group,
determining whether valid data of the second memory block group can be erased without copying when the garbage collection cost of the first memory block group is greater than the garbage collection cost of the second memory block group,
executing garbage collection of the first memory block group when the valid data of the second memory block group can be erased without copying, and
executing garbage collection of the second memory block group when the valid data of the second memory block group can not be erased without copying, and
wherein the nonvolatile memory interface is configured to interface with a three-dimensional (3D) arrayed nonvolatile memory device.

2. The memory controller of claim 1, wherein it is determined that valid data of the second memory block group can be erased without copying based on a data pattern of the valid data.

3. The memory controller of claim 1, wherein it is determined that valid data of the second memory block group can be erased without copying when the valid data is within a given address range.

4. The memory controller of claim 1, wherein it is determined that valid data of the second memory block group can be erased without copying when the valid data is journal data.

5. The memory controller of claim 1, wherein the first type of data comprises user data and the second type of data comprises metadata.

6. The memory controller of claim 5, wherein the metadata comprises journal data.

7. The memory controller of claim 1, wherein the garbage collection cost corresponds to execution time of the garbage collection.

8. A memory controller comprising:
a processor configured to control operations of a nonvolatile memory including a first memory block group storing user data, a second memory block group storing non-journal metadata, and a third memory block group storing journal data that is cyclically updated; and
a garbage collection management unit configured to execute a garbage collection policy with respect to the first, second and third memory block groups, the garbage collection policy including inhibiting garbage collection of the third memory block group until receiving the journal data that is cyclically updated with an address outside a predetermined address range.

9. The memory controller of claim 8, wherein the processor is configured to receive input data, to store the input data that is user data in the first memory block group, to store the input data that is non-journal metadata in the second memory block group, and to store the input data that is journal data in the third memory block group.

10. The memory controller of claim 9, wherein the processor is configured to determine that the input data is the journal data when an address provided with the input data is within the predetermined address range.

11. The memory controller of claim 9, wherein the processor is configured to determine that the input data is the journal data when a data pattern of the input data is a predetermined data pattern.

12. The memory controller of claim 8, further comprising:
a host interface configured to interface with a host;
a nonvolatile memory interface configured to interface with the nonvolatile memory; and
a buffer memory, wherein
the processor is configured to provide the nonvolatile memory with the user data via the nonvolatile memory interface for storage in the first memory block group, to provide the nonvolatile memory with the non-journal metadata via the nonvolatile memory interface for storage in the second memory block group, and to provide the nonvolatile memory with the journal data via the nonvolatile memory interface for storage in the third memory block group.

13. The memory controller of claim 8, wherein the nonvolatile memory comprises a three-dimensional (3D) arrayed nonvolatile memory device.

14. The memory controller of claim 8, wherein the journal data comprises metadata.

15. A memory controller comprising:
a processor configured to control operations of a nonvolatile memory including a first memory block group storing user data and a second memory block group storing metadata; and
a garbage collection management unit configured to execute a garbage collection policy with respect to the first and second memory block groups, the garbage collection policy including suspending collection of the second memory block group when the metadata subject to garbage collection is journal data that is cyclically updated and until receiving the journal data that is cyclically updated with an address outside a predetermined address range.

16. The memory controller of claim 15, further comprising:
a host interface configured to interface with a host;
a nonvolatile memory interface configured to interface with the nonvolatile memory; and
a buffer memory, wherein
the processor is configured to provide the nonvolatile memory with the user data via the nonvolatile memory interface for storage in the first memory block group and to provide the nonvolatile memory with the metadata via the nonvolatile memory interface for storage in the second memory block group.

17. The memory controller of claim 15, wherein the nonvolatile memory comprises a three-dimensional (3D) arrayed nonvolatile memory device.

18. The memory controller of claim 15, wherein the processor is configured to determine that the metadata is the journal data when an address provided with the metadata is within the predetermined address range.

19. The memory controller of claim 15, wherein the processor is configured to determine that the metadata is the journal data when a data pattern of the metadata is a predetermined data pattern.

* * * * *